United States Patent
Matsuda et al.

(10) Patent No.: US 7,640,377 B2
(45) Date of Patent: Dec. 29, 2009

(54) DMA CIRCUIT WITH PATTERN GENERATION UNIT FOR DMA VERIFICATION

(75) Inventors: Shinnosuke Matsuda, Kawasaki (JP); Nina Arataki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 198 days.

(21) Appl. No.: 11/589,997

(22) Filed: Oct. 31, 2006

(65) Prior Publication Data
US 2008/0005386 A1 Jan. 3, 2008

(30) Foreign Application Priority Data
Jun. 2, 2006 (JP) .............. 2006-154419

(51) Int. Cl.
*G06F 13/28* (2006.01)
(52) U.S. Cl. ......................... 710/22; 710/30
(58) Field of Classification Search ............. 710/22–28, 710/30
See application file for complete search history.

(56) References Cited

U.S. PATENT DOCUMENTS 5,621,883 A * 4/1997 Thoulon et al. ............... 714/9
2002/0087786 A1 * 7/2002 Burton et al. ............... 711/112
2003/0081635 A1   5/2003 Ando et al.
2006/0095611 A1 * 5/2006 Winchester et al. ........... 710/52
2006/0123158 A1 * 6/2006 Evans et al. ................... 710/36
2007/0263629 A1 * 11/2007 Cornett et al. ............... 370/392

FOREIGN PATENT DOCUMENTS

JP 07-319728 12/1995
JP 2003-143217 5/2003

OTHER PUBLICATIONS

Chan Kim, Jong-Arm Jun, Kyou-Ho Lee, Hyup-Jong Kim, Design Implementation of an ATM Segmentation Engine with PCI Interface, 1998, IEEE, pp. VI-510-VI-513.*

* cited by examiner

*Primary Examiner*—Eron J Sorrell
(74) *Attorney, Agent, or Firm*—Staas & Halsey LLP

(57) ABSTRACT

In a send engine of a protocol/DMA control circuit, a descriptor control circuit obtains a descriptor, and notifies the information of the descriptor to each circuit. A dummy/padding generation circuit generates a data pattern according to the instruction of the descriptor. A write control circuit performs data transfer using the generated data pattern as a dummy transfer data according to the instruction of the descriptor. The write control circuit also inserts the generated data pattern into the transfer data as a padding data according to the instruction of the descriptor, and performs data transfer.

4 Claims, 10 Drawing Sheets

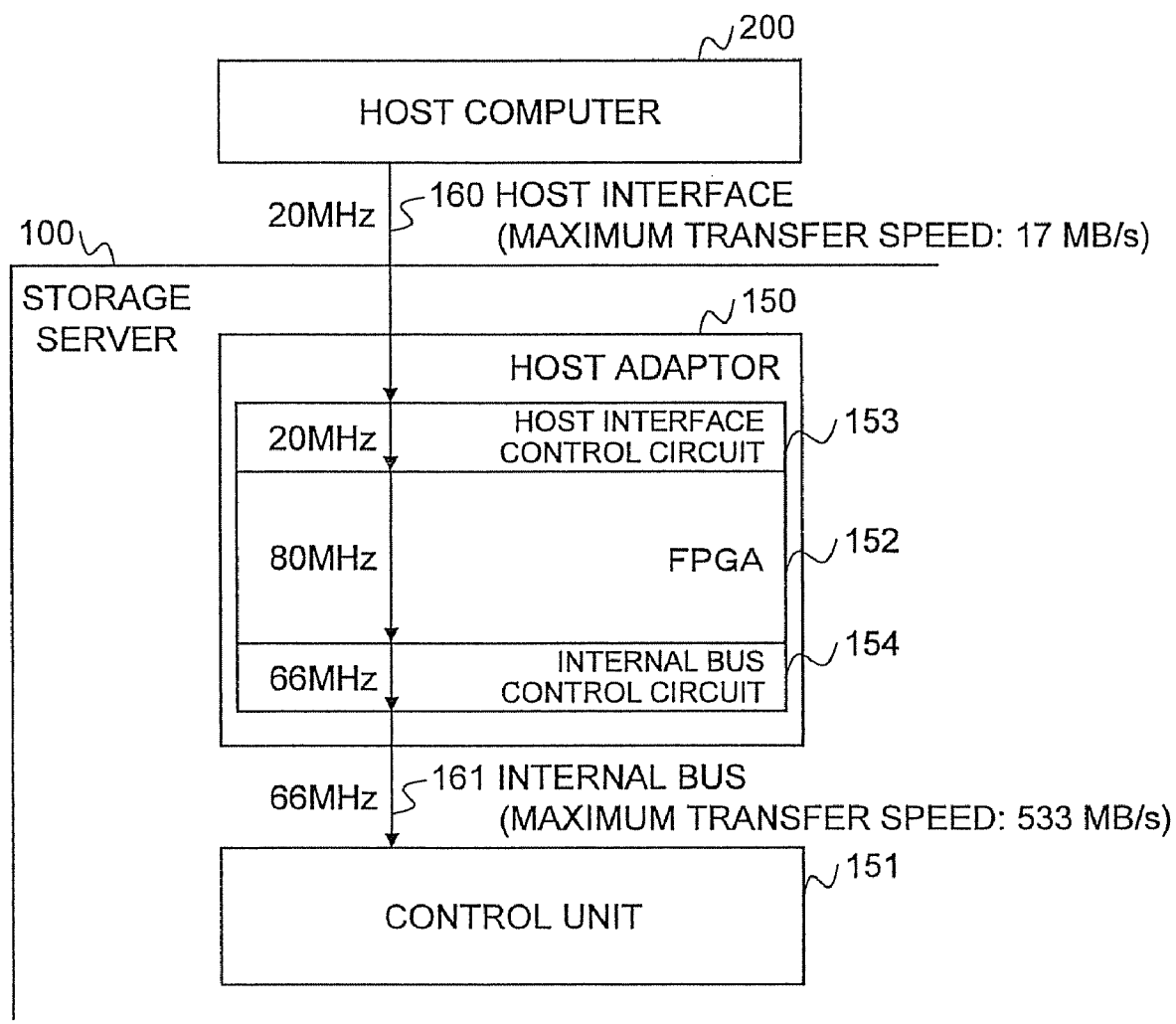

US 7,640,377 B2

DMA CIRCUIT WITH PATTERN GENERATION UNIT FOR DMA VERIFICATION

CROSS-REFERENCE TO RELATED APPLICATIONS

This application claims the conventional priority based on Japanese Patent Application No. 2006-154419, filed on Jun. 2, 2006, the disclosures of which are incorporated herein by reference.

BACKGROUND OF THE INVENTION

1. Field of the Invention

This invention relates to a DMA circuit, especially to a DMA circuit that enables to perform efficient and effective system verification by generating a data pattern suitable for verification within a Large Scale Integration (LSI) circuit.

2. Description of the Related Art

Recently, as a variety of data is computerized and handled on a computer, a storage server in which data of large capacity can be efficiently stored independently from the computer becomes more and more important. The storage server is required not to stop operations in operation, and it is important for the server to have high quality. It is necessary to perform sufficient verification particularly in development of the server. However, as the size of the storage server is enormously increased, the ratio of verification time over development time tends to increase, and thus in order to reduce the development cycle it is needed to reduce the verification time.

FIG. 4 is a diagram showing an example of a storage system. The storage system shown in FIG. 4 includes a storage server 100 and a host computer 200. As an example of the storage server 100, for example, a RAID device and so on is listed. RAID (Redundant Arrays of Independent (or Inexpensive) Disks) is a technique for constructing a higher speed, larger capacity and higher reliability disk system compared to a single hard disk drive (HDD) by combining a plurality of HDDs. For example, a RAID 5 is known which realizes high reliability and high speed operations by performing striping (distributed writing/reading from the plurality of drives) to the a plurality of disks in recording data and parity information. A RAID 1 is known which performs mirroring operations. Additionally, by adding a check code to the data, further high reliability implementation is provided.

The storage server 100 includes a channel adaptor (CA) 101, a cache control unit (a central module (CM), hereinafter referred to as a CM) 102, a cache memory 103, a device adaptor (DA) 104, a switch 105, and a drive module (DM) 106.

The channel adaptor 101 is a adaptor which controls an I/O between the host computer 200. The channel adaptor 101 controls a variety type of interfaces such as a fiber channel (FC) and an iSCSI, and performs data transfer to an internal bus, conversion of the data of the internal bus into a variety of I/Os and so on. Additionally, the channel adaptor 101 adds redundancy bits (CRC or BID) for protecting the data adapted to a disk format, to user data transferred from the host computer 200, and then writes the data into the disk through the cache control unit 102. Furthermore, the channel adaptor 101 checks the data read from the disk, removes the redundancy bits for the data protection, and transfers the data to the host computer 200.

The channel adaptor 101 has a DMA dedicated to the data storage system for efficiently performing addition of the data protection bits specific to the storage device and performing check/removal of the data protection bits.

The cache control unit 102 controls data transfer and so on between the channel adaptor 101, the cache memory 103, and the device adaptor 104. The device adaptor 104 is one of the disk array modules, and connects and controls a plurality of drive modules 106. The drive module 106 is a hard disk drive packaged for a magnetic disk system.

FIG. 5 is a diagram showing an example of a channel adaptor. The example of an internal structure of the channel adaptor 101 shown in FIG. 5 is the example of an internal structure of the channel adaptor 101 connected to the host computer through an optical fiber channel.

The channel adaptor 101 includes a Micro Processor Unit (MPU) 110 in which a firmware is embedded, a memory 111, a chip set 112 which connects between the MPU 110 and an external interface, a SERDES (serialization/deserialization) 113 which performs a serial to parallel conversion changing from an optical signal into an electrical signal, and a protocol/DMA control circuit 114 which performs fiber channel protocol control and DMA control to perform data transfer by receiving an instruction from the MPU 110. In the channel adaptor 101 shown in FIG. 5, particularly, a specialized LSI (a protocol/DMA control circuit 114) is used which includes both of the fiber channel protocol control and the DMA control is used. The fiber channel protocol control and the DMA control may be provided by a different LSI, respectively.

Direct memory access (DMA) is a mode in which direct data transfer is performed between an apparatus and a RAM without passing through a MPU. Here, the specialized LSI has the DMA (DMA function) which is added functions specific to a storage system such as a search (read DMA) function, a data check (read DMA) function, a data check cord addition (write DMA) function, and so on. In the DMA, data is transferred by a hardware base according to a MPU instruction.

FIG. 6 is a diagram showing an example of a structure of a protocol/DMA control circuit. The protocol/DMA control circuit 114 includes a protocol control circuit 120, a send engine 121, a host interface 122, a PCI interface 123, and a CM interface 124. The send engine 121 includes a descriptor control circuit 130, a host data control circuit 131, a BCC generation circuit 132, a FCC generation circuit 133, and a write control circuit 134.

In the protocol/DMA control circuit 114, the protocol control circuit 120 receives host data through the host interface 122, and performs protocol control. The send engine 121 is a DMA engine for data write operations (a DMA engine for write DMA from the host computer 200 to the cache memory 103). The send engine 121 receives a descriptor from the MPU 110 through the PCI interface 123, and transfers data to the cache control unit (CM) 102 through the CM interface 124 according to information of the descriptor.

In the send engine 121, the descriptor control circuit 130 obtains the descriptor from the MPU 110 through the PCI interface 123, and notifies the information of the descriptor to each circuit. The host data control circuit 131 performs input control of host data according to the information of the descriptor. The BCC generation circuit 132 generates a block check code (BCC) according to the information of the descriptor. The FCC generation circuit 133 generates a field check code (FCC) according to the information of the descriptor. The write control circuit 134 performs transfer control of data to the CM according to the information of the descriptor.

The descriptor will now be described below. A descriptor is an instruction from a MPU to a DMA control circuit. There is a widely used method in which, after the MPU has prepared a descriptor on a memory, the DMA control circuit itself reads the descriptor from the memory to refer to the descriptor is widely used. The instruction to the DMA control circuit is specifically a read address/write address to which the DMA accesses, a data transfer length, an operation mode, and so on. For example, the operation mode indicates whether or not the MPU is notified after a data transfer is completed, whether or not data checking is performed, and whether or not data compare is performed, and so on. The descriptor is data which has a specific size data and a certain fixed format.

FIG. 7 is a diagram showing an example of descriptors. The descriptor shown in FIG. 7 is an example of descriptor 140 for data write operations. The descriptor 140 is stored in a memory 141, and includes Mode, DL, CMA, BBID, and FBID information. In the Mode information, a bit0 represents the presence or absence of notification to the MPU after a data transfer is completed, a bit1 represents the presence or absence of generation of the BCC, and a bit2 represents the presence or absence of generation of the FCC. In the DL information, a data transfer length is specified. In the CMA information, a transfer destination address is specified. In the BBID information, a BCC-BID is set. In the FBID information, a FCC-BID is set.

The MPU describes into the descriptor 140 a processing instruction to the DMA control circuit, and writes the descriptor in the memory 141 (construction of the descriptor). When there is a plurality of processing instructions, a plurality of descriptors is written into continuous memory areas. The MPU notifies an address pointer of the constructed descriptor 140 to the DMA control circuit. The LSI in which the DMA control circuit is embedded itself reads the descriptor 140 on the memory 141, and executes a processing instruction (data transfer). When any other descriptor 140 is remained, the LSI reads a next descriptor 140, and continues the process (data transfer).

FIG. 8 is a diagram showing a concept of descriptors. Here, the descriptors 140 are stored in a descriptor area of the memory 141 for each DMA engine. For example, in FIG. 8, a "DMA2 Descriptor" is supposed to be a descriptor storage area for the send engine, and the descriptors 140 (Descriptor#0 to Descriptor#4 in FIG. 8) are stored in the continuous areas of the "DMA2 Descriptor". The LSI 142 in which DMA engines are embedded reads the descriptor 140 based on the address pointer of the descriptor notified from the MPU, and executes the data transfer according to the instruction of the descriptor 140.

Additionally, in FIG. 8, DMA_BASE represents a base address of an access area of the DMA (access area of the memory 141), and DSC_BASE represents a base address of the descriptor area. Further, DMA2_TOP represents a descriptor pointer (TOP pointer) during execution reservation, and DMA2_BTM represents a descriptor pointer (BTM pointer) during processing. Each time the LSI 142 completes the data transfer instructed by the read descriptor 140, the LSI 142 changes the location of the BTM pointer to the location of the descriptor 140 to be read next. When the BTM pointer is the same as the TOP pointer, the series of DMA data transfers are completed.

A data check code will now be described. As general data check codes, there is known a block check code (BCC) and a field check code (FCC). The BCC and FCC has redundancy bits which include cyclic redundancy check (CRC) and block ID (BID), and which are appended to the data and sent with the data. The CRC is generated from data of a certain management block unit by performing an operation based on a generation polynomial. The BID is, for example, information indicating a data location or a tag managed by a firmware.

FIG. 9 is a diagram showing a concept of a BCC and a FCC. As shown in FIG. 9, the BCC (shown as a diagonally shaded area) is always written into the last 8 bytes of 520 bytes. Additionally, the FCC (shown as a meshed area) may be written into the last 8 bytes of 64 bytes.

As an example of a disk formatting, there is a method in which a disk is managed for each fixed length logical block unit. For example, data management is performed for each 520 bytes by appending to 512 bytes of data a total of 8 bytes of data including the CRC (BCC-CRC) generated from the data and the BID (BCC-BID) indicating location information of the data. The top address of the block unit or the block is referred to as a logical block address (LBA).

As an example of a disk formatting, there is a method in which a set of three kind of data formats (fields) of Count/Key/Data is defined as a record, and data management is performed using the record as a unit. This method is common mainly in a global server (mainframe). The Count is a fixed length field, the Key and the Data are variable length fields. The Count portion includes Key length and Data length information. For each field, a total of 8 bytes of data including the CRC (FCC-CRC) generated from the data in the field and the BID (FCC-BID) having location information or management information of the data is written as protection information. In FIG. 9, reference character Pad denotes a padding data. The padding data is usually 0.

Japanese Patent Laid-Open No. 07-319728 and so on is a document which describes a conventional technique performing verification of an apparatus having DMA. Japanese Patent Laid-Open No. 07-319728 describes a technique for testing a DMA function of a circuit device. Japanese Patent Laid-Open No. 07-319728 describes a test of a DMA circuit having a function for moving data from one memory area to another memory area (fold-back function). Since the technique described in Japanese Patent Laid-Open No. 07-319728 is a technique for the purpose of performing a memory test, the problems to be solved according to the present invention hereinafter described cannot be solved.

In performing a load test of the system using DMA, when a LSI is connected through both of a low speed I/O and a high speed I/O, it is difficult to give the maximum load on the high speed I/O in the data transfer from the low speed I/O to the high speed I/O. So, performance verification is difficult. Specifically, this corresponds to the case that a speed of an internal bus of the storage server is faster than that of the host interface. Also, this corresponds to the case that, when utilizing an existing circuit and Intellectual Property Core (IP) and so on, there appears a difference between the operating frequency of an existing circuit unit and the operating frequency of a newly designed circuit unit.

FIG. 10 is a diagram showing an example of a portion of a storage system. In the storage system of FIG. 10, the storage server 100 and the host computer 200 are connected to each other through a host interface 160. The storage server 100 includes a host adaptor 150, and a control unit 151. Here, the host adaptor 150 corresponds to the channel adaptor 101 of FIG. 4, and the control unit 151 corresponds to the cache control unit 102 of FIG. 4. In the host adaptor 150, a circuit such as a DMA engine is realized by a field programmable gate array (FPGA) 152.

In FIG. 10, a connection between the global server (mainframe) and the storage server is supposed. The host interface 160, which connects between the host computer 200 and the host adaptor 150, has the maximum transmission distance of 10 km and is effective for data transfer over long distance.

However, the host interface 160 is a somewhat slow speed interface with the maximum transfer speed of 17 MB/s. On the other hand, the internal bus 161 between the host adaptor 150 and the control unit 151 has the maximum transfer speed of 533 MB/s since the internal bus 161 follows a speed of other host interface of high speed.

The operating frequency of the host interface is 20 MHz, and the operating frequency of the internal bus is 66 MHz. Additionally, the internal operating frequency of the specialized LSI is adapted to the frequencies of the host interface 160 and the internal bus 161. Thus, the operating frequencies of a host interface control circuit 153, an internal bus control circuit 154 and a FPGA 152 are 20 MHz, 66 MHz and 80 MHz, respectively.

In the storage system of FIG. 10, when the host computer 200 accesses to the storage server 100 at the maximum transfer speed (17 MB/s), load verification between the host computer 200 and the host adaptor 150 can be sufficiently performed. However, since the load is not sufficiently given between the host adaptor 150 and the control unit 151, verification of the FPGA 152 as the actual device will be insufficient. Since it is difficult to operate the internal bus 161 in a toggle mode at the operating ratio of 100%, the measurement of the maximum power dissipation, the connectivity of each module within an apparatus, and the data integrity in a case that the data load is given cannot be sufficiently verified. So, deterioration of the quality may occur.

SUMMARY OF THE INVENTION

It is an object of the present invention to provide a DMA circuit that achieves an improvement of quality of a LSI by facilitating a load test of a high speed I/O and debug in a system.

In order to solve the above mentioned problems, the present invention has features that a send DMA circuit performing write operations is provided with a unit generating a predetermined dummy data pattern, and that a data pattern suitable for verification under a high load is deliberately generated in the circuit. As a result of this, it is possible to facilitate load testing of the high speed I/O, and to achieve the improvement of quality of the LSI.

The present invention also has features that, although padding data inserted between data and data protection bits is usually 0, a predetermined data pattern is inserted into the padding data in transfer data. As a result of this, a data pattern can be changed without modifying the transfer data itself, so that it becomes easy to generate a variety of verification data pattern, and to debug a system.

Specifically, the DMA circuit of the present invention is the DMA circuit performing data transfer according to a descriptor that is instruction information of the data transfer. The DMA circuit comprises a descriptor obtaining unit obtaining a descriptor, a data pattern generation unit generating a data pattern for verification of the DMA circuit, and a data transfer unit performing data transfer. The data pattern generation unit generates the data pattern according to an instruction of the descriptor in a case that generation of the data pattern is instructed by the descriptor obtained by the descriptor obtaining unit. The data transfer unit uses the data pattern generated by the data pattern generation unit as dummy transfer data according to the obtained descriptor.

Preferably, the DMA circuit of the present invention is the DMA circuit performing data transfer according to a descriptor that is instruction information of the data transfer. The DMA circuit comprises a descriptor obtaining unit obtaining a descriptor, a data pattern generation unit generating a data pattern for verification of the DMA circuit, and a data transfer unit performing data transfer. The data pattern generation unit generates the data pattern which is used for padding according to information set in the descriptor obtained by the descriptor obtaining unit. The data transfer unit inserts the data pattern generated by the data pattern generation unit into transfer data as padding data according to an instruction of the obtained descriptor.

Preferably, the DMA circuit of the present invention is the DMA circuit performing data transfer according to a descriptor that is instruction information of the data transfer. The DMA circuit comprises a descriptor obtaining unit obtaining a descriptor, a data pattern generation unit generating a data pattern for verification of the DMA circuit, and a data transfer unit performing data transfer. The descriptor has an area in which mode information including at least a dummy mode and a toggle mode is specified, and an area in which a first pattern and a second pattern for generating the data pattern are specified. The data pattern generation unit generates a data pattern in which the first pattern and the second pattern are alternately repeated in a case that the dummy mode is set and the toggle mode is set in the descriptor obtained by the descriptor obtaining unit, and generates a data pattern in which only the first pattern is included in a case that the dummy mode is set and the toggle mode is not set in the obtained descriptor. The data transfer unit uses the data pattern generated by the data pattern generation unit as dummy transfer data in a case that the dummy mode is set in the obtained descriptor.

According to the present invention, in a case that an interface of a LSI is connected through both of a low speed I/O and a high speed I/O, a load can be imposed on the high speed I/O without being bound by the maximum performance of the low speed I/O, and therefore the present invention allows sufficient performance verification to be performed. Additionally, because a predetermined data pattern can be set, the present invention is also effective for the study of problems. As described above, the sufficient load test can be performed, and the improvement of quality of a unit can be achieved.

BRIEF DESCRIPTION OF THE DRAWINGS

FIG. 10 is a diagram showing an example of a portion of a storage system.

DETAILED DESCRIPTION OF THE PREFERRED EMBODIMENTS

Embodiments of the present invention will now be described below with reference to the accompanied drawings.

Figure 1:
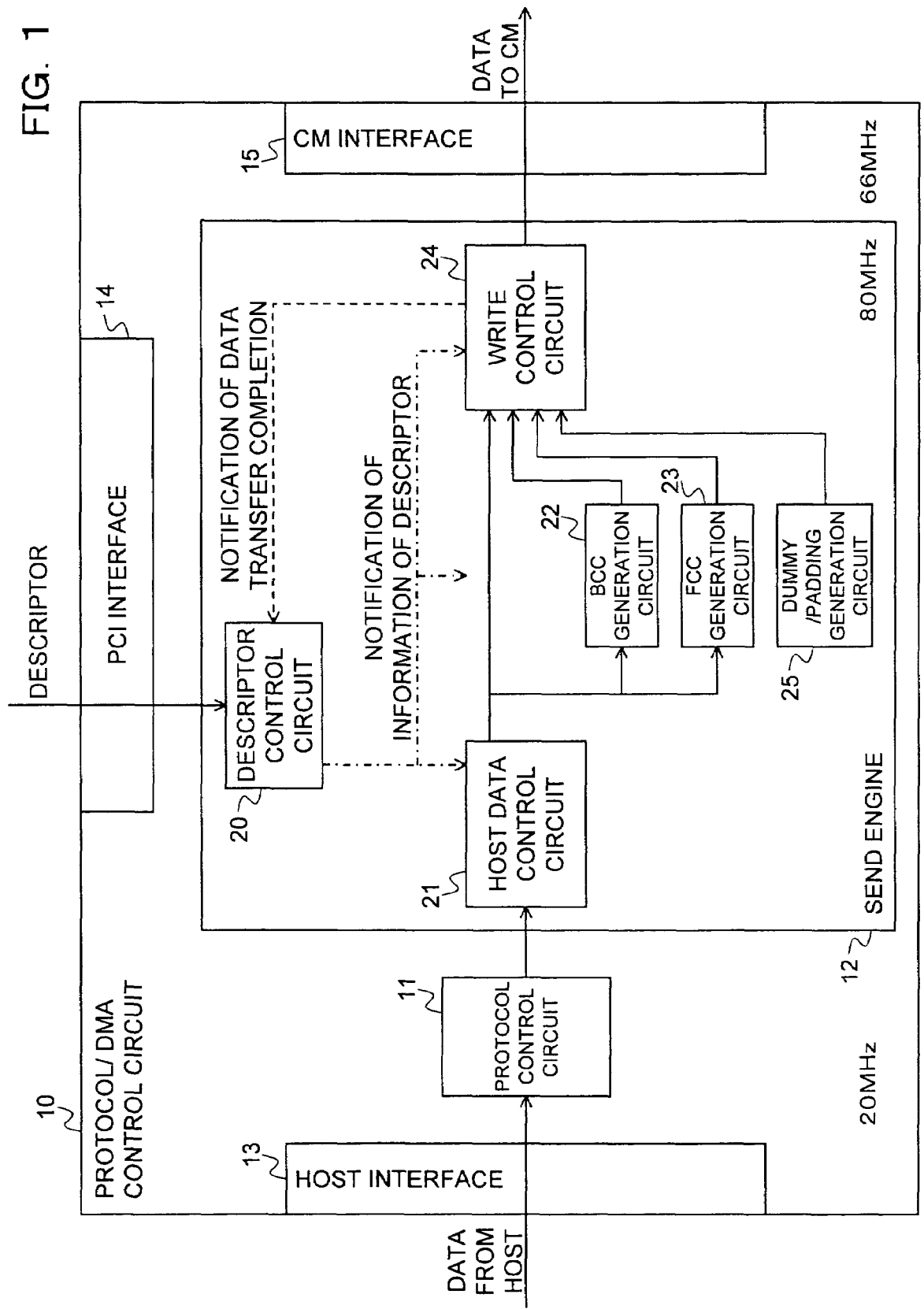
FIG. 1 is a diagram showing an example of a structure of a protocol/DMA control circuit according to an embodiment of the present invention.

FIG. 1 is a diagram showing an example of a structure of a protocol/DMA control circuit according to an embodiment of the present invention. The protocol/DMA control circuit 10 includes a protocol control circuit 11, a send engine 12, a host interface 13, a PCI interface 14, and a CM interface 15. The send engine 12 includes a descriptor control circuit 20, a host data control circuit 21, a BCC generation circuit 22, a FCC generation circuit 23, a write control circuit 24, and a dummy/padding generation circuit 25.

In FIG. 1, the circuits having a mark of 20 MHz operate at the same operating frequency 20 MHz as the operating frequency of the host interface 13. The CM interface 15 operates at 66 MHz, and other internal circuits operate at 80 MHz.

In the protocol/DMA control circuit 10, the protocol control circuit 11 receives host data through the host interface 13, and performs protocol control. The send engine 12 is a DMA engine for data write operations. The send engine 12 receives a descriptor from a (Micro Processor Unit) through the PCI interface 14, and transfers data to a CM through the CM interface 15 according to the information of the descriptor.

In the send engine 12, the descriptor control circuit 20 obtains the descriptor from the MPU through the PCI interface 14, and notifies the information of the descriptor to each of the circuits. The host data control circuit 21 inputs host data according to the information of the descriptor. The BCC generation circuit 22 generates a block check code (BCC) according to the information of the descriptor. The FCC generation circuit 23 generates a field check code (FCC) according to the information of the descriptor. The write control circuit 24 performs transfer control of the data to the CM according to the information of the descriptor. The dummy/padding generation circuit 25 is a circuit which generates a data pattern such as a dummy pattern or a padding pattern according to the information of the descriptor.

Figure 2:
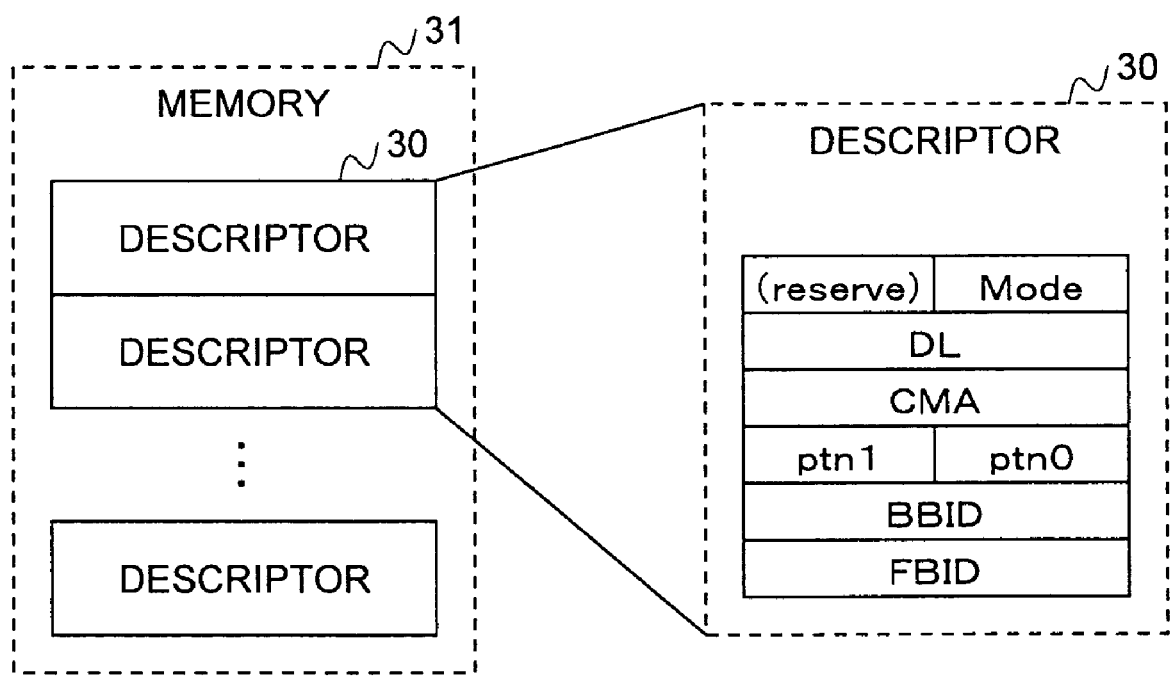
FIG. 2 is a diagram showing an example of descriptors according to an embodiment of the present invention.
Figure 7:
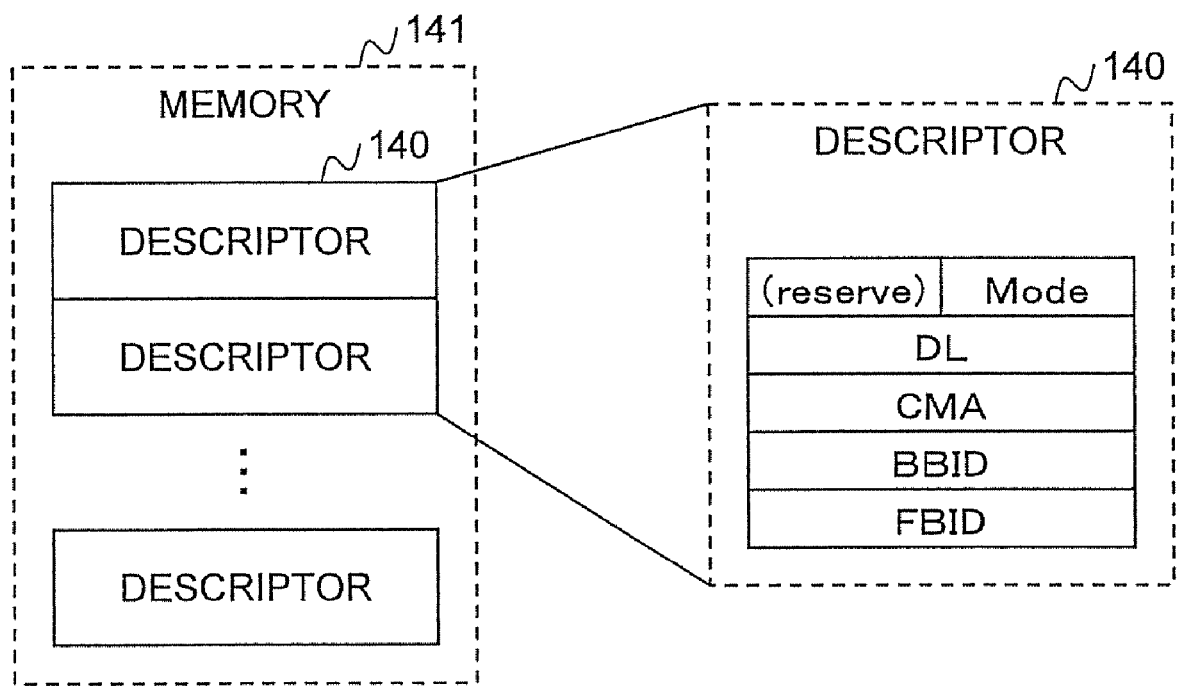
FIG. 7 is a diagram showing an example of descriptors.
Figure 8:
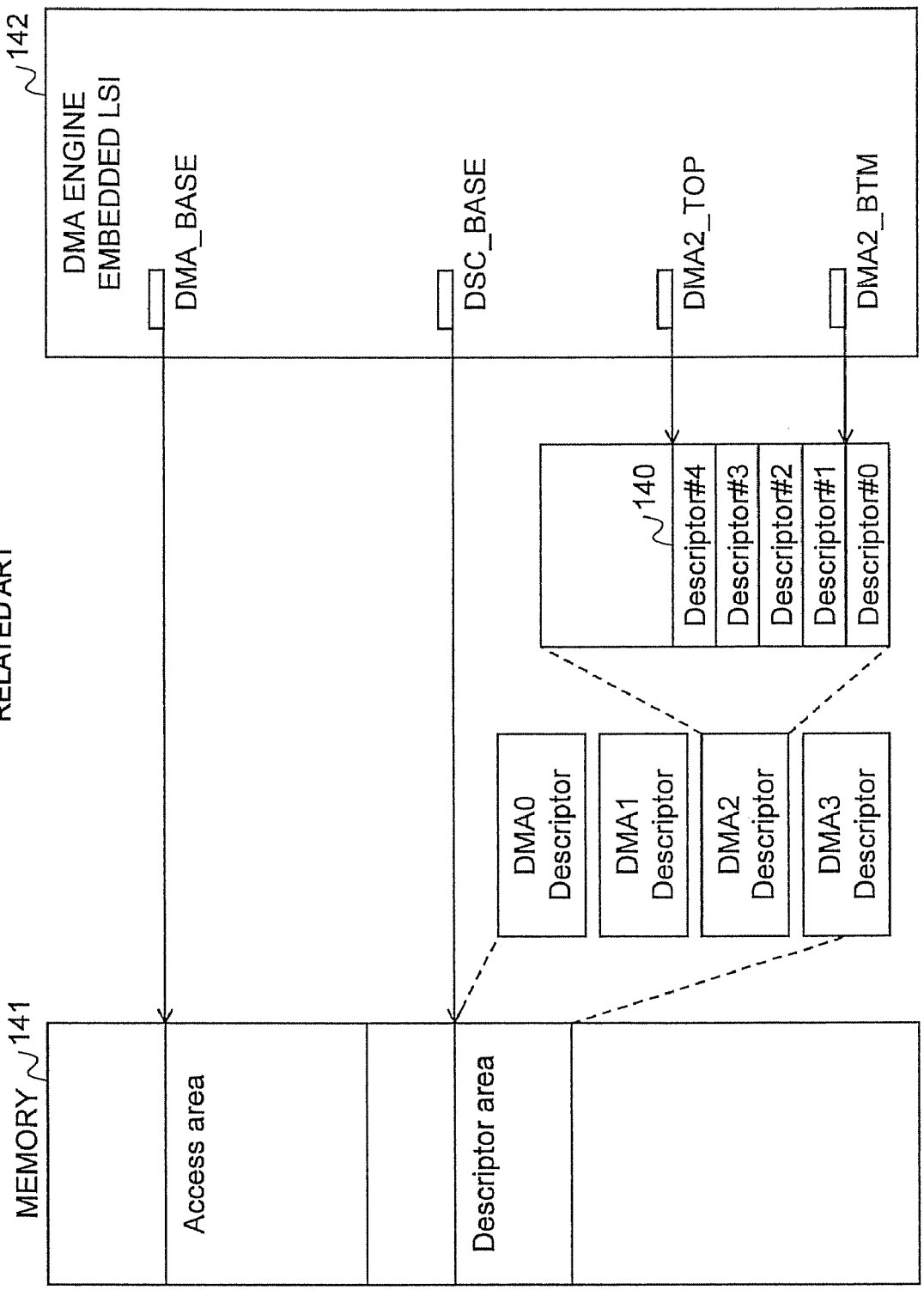
FIG. 8 is a diagram showing a concept of descriptors.
Figure 9:
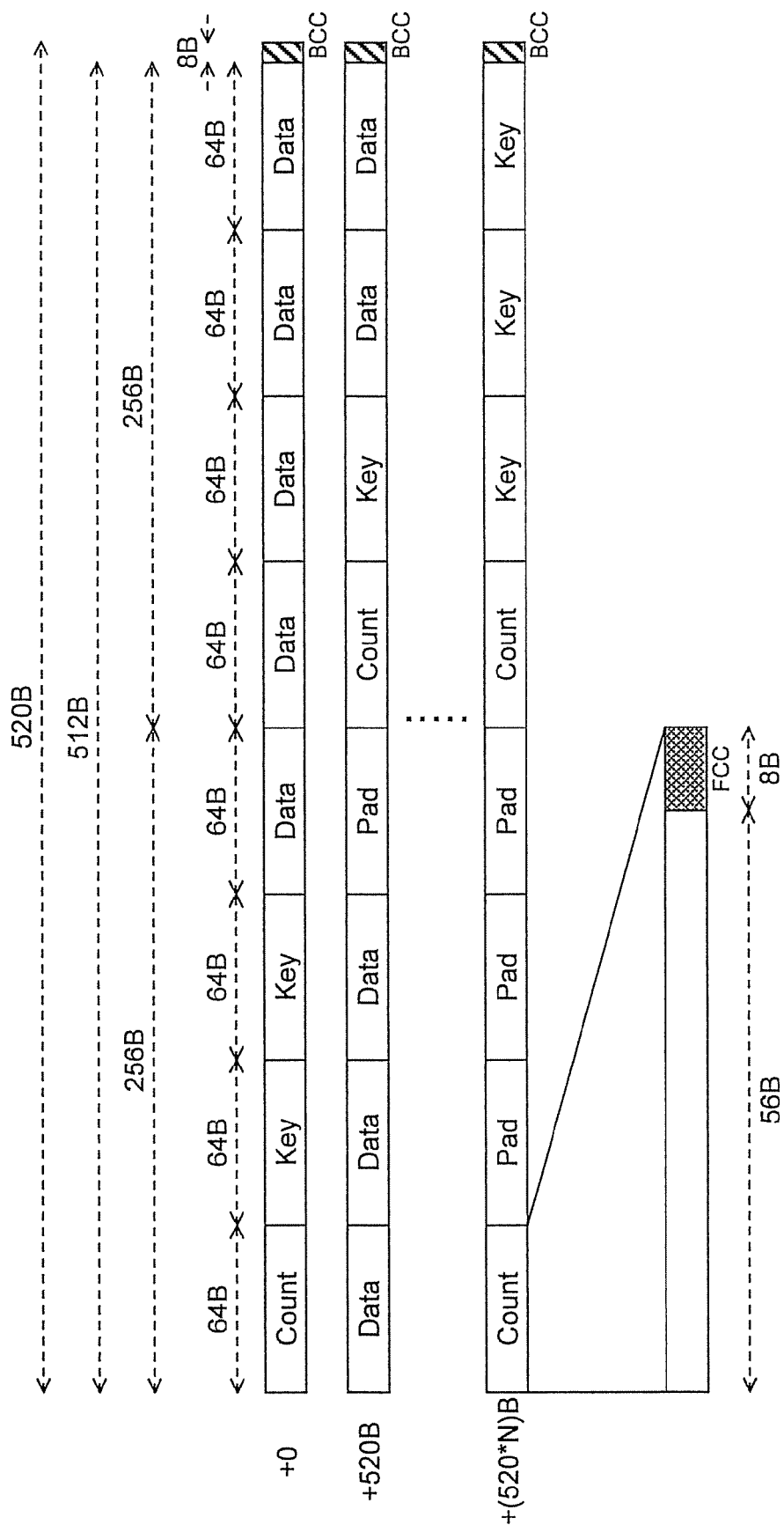
FIG. 9 is a diagram showing a concept of a BCC and a FCC.

FIG. 2 is a diagram showing an example of descriptors according to an embodiment of the present invention. A descriptor 30 shown in FIG. 2 is an example of the descriptor 30 for data write operations. The descriptor 30 is stored in a memory 31, and includes Mode, DL, CMA, ptn0, ptn1, BBID, and FBID information. The DL, CMA, BBID, and FBID information are the same as the DL, CMA, BBID, and FBID information of the descriptor 140 shown in FIG. 7. In the Mode information, bit0 to bit2 are also the same as the bit0 to the bit2 of the descriptor 140 shown in FIG. 7. That is, the descriptor 30 shown in FIG. 2 corresponds to the descriptor generated by adding the Mode (bit3, bit4), ptn0, and ptn1 information to the descriptor 140 shown in FIG. 7.

In the Mode information, bit3 represents set/reset (set/reset information) of a dummy mode, and bit4 represents set/reset of a toggle mode. In the ptn0 information, a dummy/padding data pattern is specified. In the ptn1 information, a pattern used in the toggle mode is specified.

When the dummy mode is set, the dummy/padding generation circuit 25 sends a data pattern set in the ptn0 information to the write control circuit 24 as a dummy pattern. When the dummy mode is not set, the dummy/padding generation circuit 25 sends a data pattern set in the ptn0 information to the write control circuit 24 as a padding pattern, and causes the write control circuit 24 to add the data pattern to user data to be transferred. When the dummy mode is not set and the ptn0 information is all zero pattern, the dummy/padding generation circuit 25 performs the same padding as the conventional usual padding. When a test is performed, the dummy/padding generation circuit 25 can change the padding data by setting a predetermined pattern as the ptn0 information corresponding to the purpose of the test.

When the toggle mode is set, the dummy/padding generation circuit 25 sends a data pattern, in which the data patterns of the ptn0 information and the data pattern of the ptn1 information are alternately exchanged, to the write control circuit 24. Consequently, the data pattern, in which the ptn0 information and the ptn1 information are alternately repeated, with length specified by the data transfer length DL will be transferred as a dummy data. By setting different values to each of the ptn0 and ptn1 informations, it becomes easy to evaluate a ground bounce and cross talk tolerance within the high speed I/O and the circuit. Note that the ground bounce has the meaning that, when the internal state and the output of an Integrated Circuit (IC) or Large Scale Integration (LSI) change simultaneously, the ground level of the IC changes due to parasitic capacitance of a pin/bonding wire, the ground impedance, and so on. Additionally, the cross talk has the meaning that an unnecessary signal leaks to a certain circuit or a line due to effects such as a floating capacitance, a parasitic capacitance, a common impedance of the ground, and so on.

Additionally, by changing the padding pattern for each descriptor 30, without keeping the padding pattern constant, for example when a unnecessary data change occurs during verification, it can be determined that the unnecessary data change is caused in which data transfer according to descriptor 30.

When the write control circuit 24 receives a dummy pattern from the dummy/padding generation circuit 25, the write control circuit 24 performs data transfer using the dummy pattern as the transfer data to the CM. Also, when the write control circuit 24 receives a padding pattern from the dummy/padding generation circuit 25, the write control circuit 24 inserts the padding pattern into the transfer data received from the host data control circuit 21 as the padding data, and performs data transfer to the CM.

Figure 3:
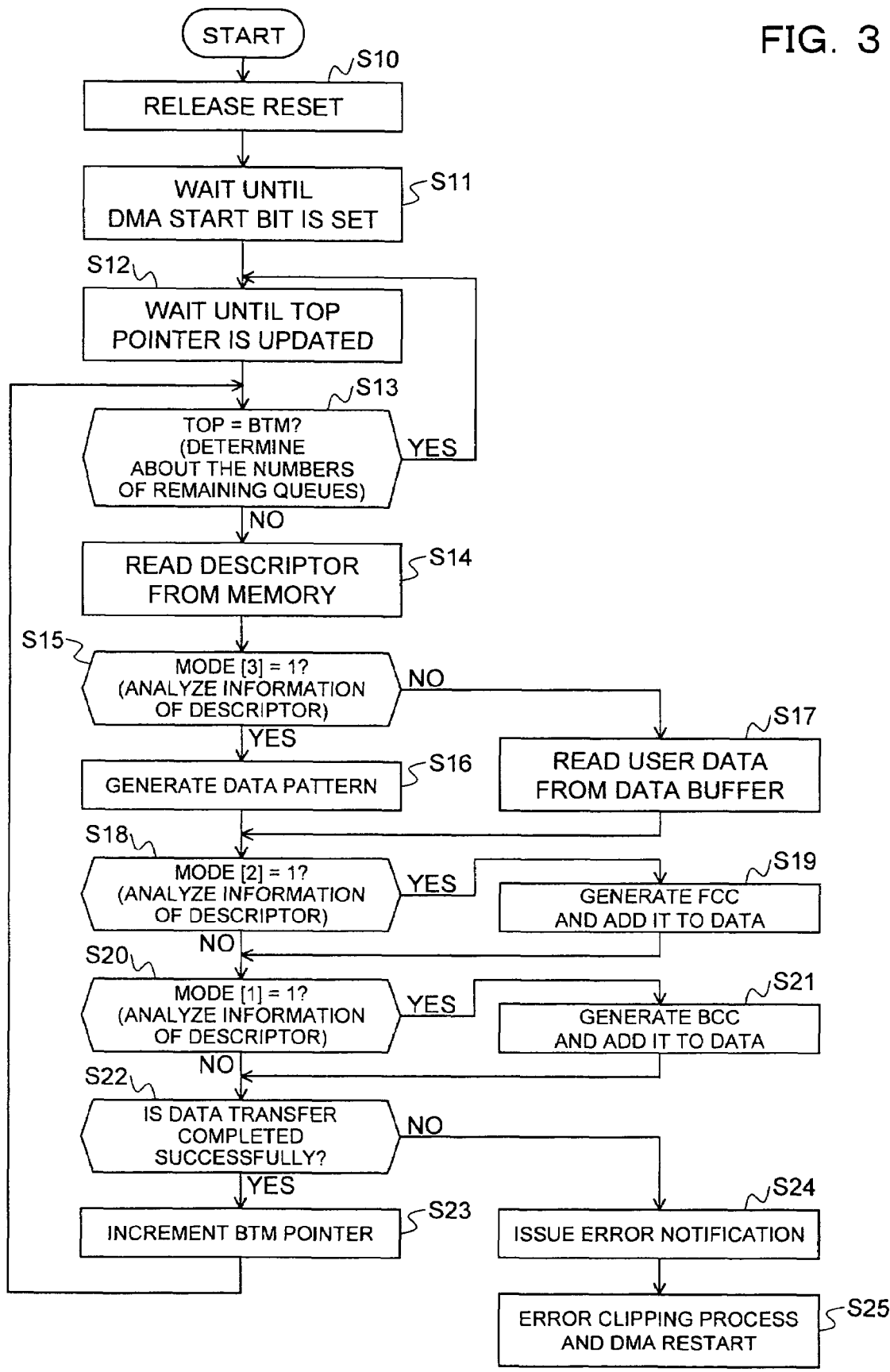
FIG. 3 is a flow chart of a data transfer process performed by a send engine according to an embodiment of the present invention.
Figure 4:
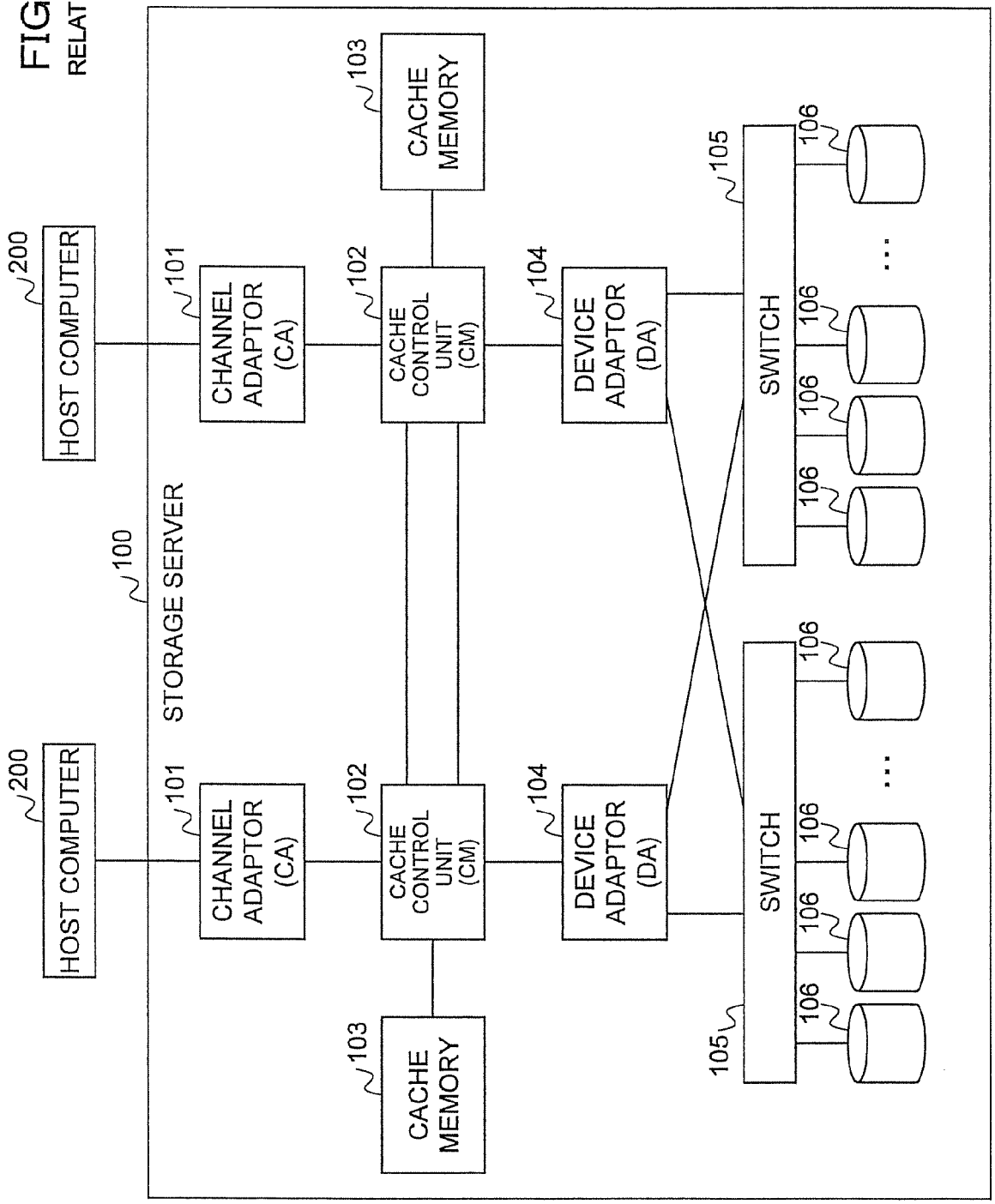
FIG. 4 is a diagram showing an example of a storage system.
Figure 5:
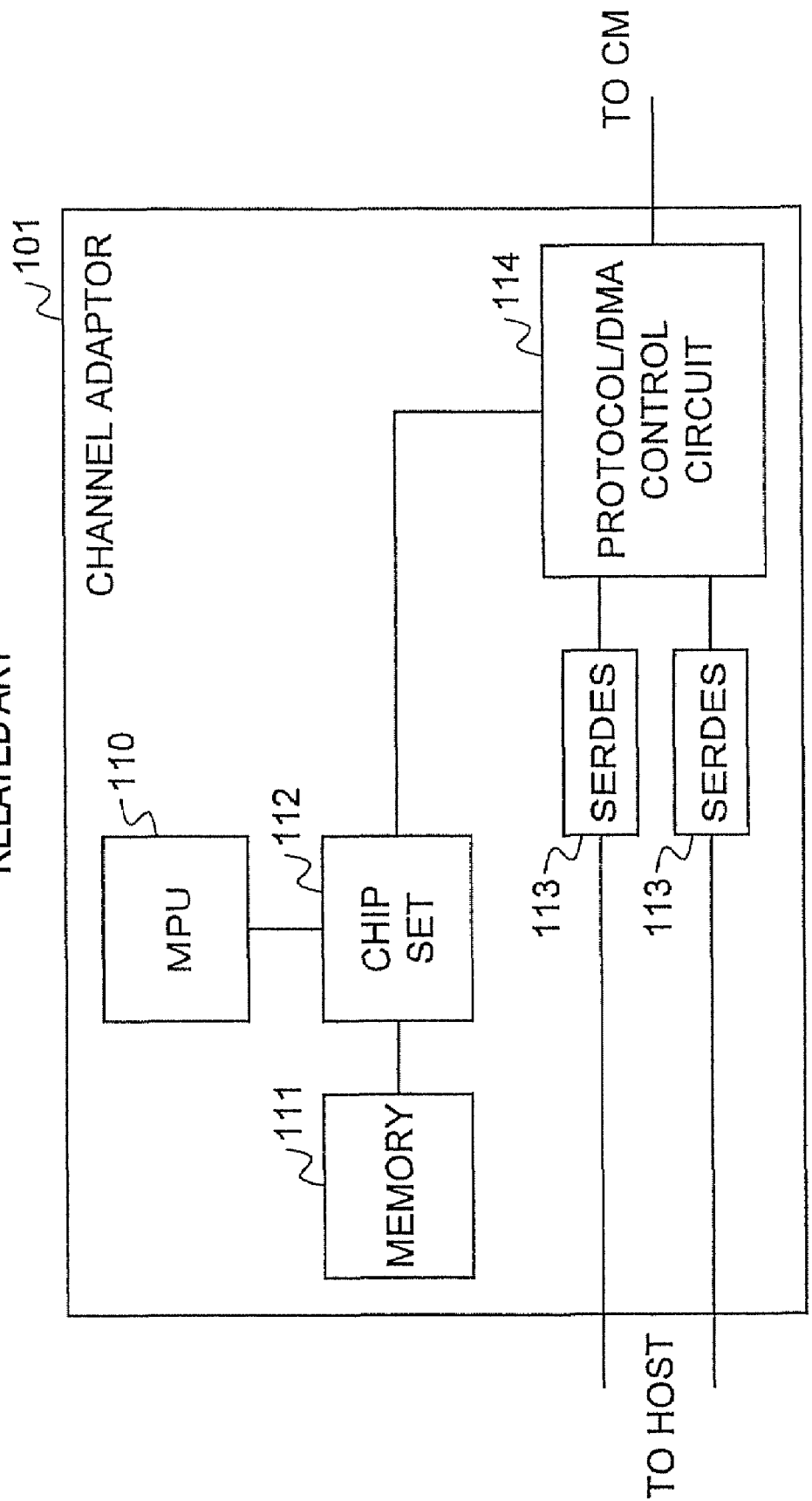
FIG. 5 is a diagram showing an example of a channel adaptor.
Figure 6:
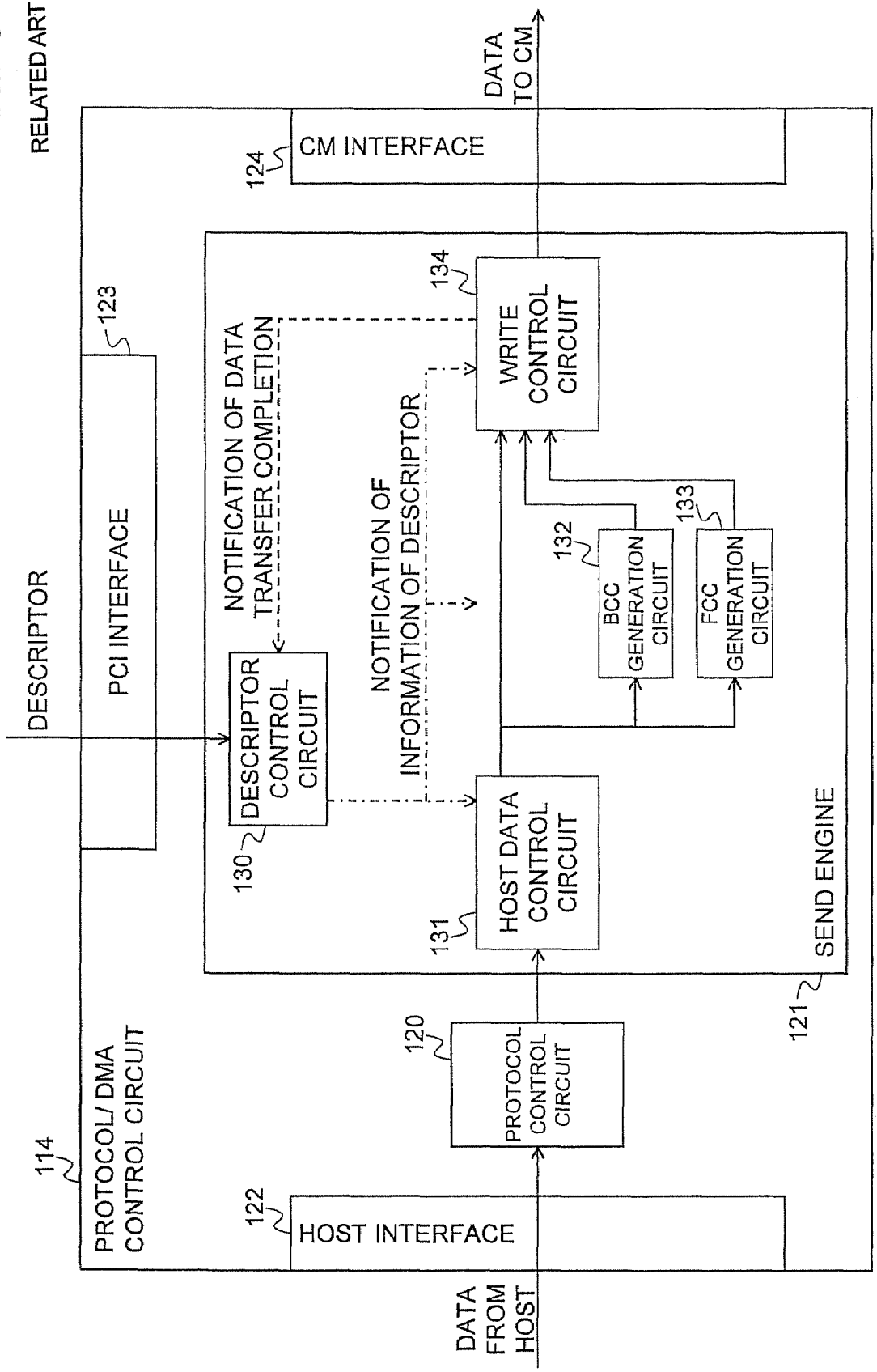
FIG. 6 is a diagram showing an example of a structure of a protocol/DMA control circuit.

FIG. 3 is a flow chart of a data transfer process performed by a send engine according to an embodiment of the present invention. Hereinafter, a TOP pointer represents a top address in which a queue constructed by the MPU is stored. A BTM pointer represents an address of the queue of which a data transfer process is completed. Additionally, for example, the bit3 of the Mode information is represented as Mode [3]. Note that, in the example shown in FIG. 3, insertion of the padding pattern into the transfer data is not performed.

When reset is released (step S10), the send engine 12 waits until a DMA start bit is set by the MPU (step S11).

When the DMA start bit is set by the MPU, the send engine 12 waits until the TOP pointer is updated by the MPU (step S12).

When the TOP pointer is updated by the MPU, the send engine 12 performs determination about the number of remaining queues. The difference of the TOP pointer and the BTM pointer is the number of remaining queues to be processed thereafter. When the send engine 12 determines that the TOP pointer is equal to the BTM pointer (step S13), the process returns to step S12, and the send engine 12 waits until the TOP pointer is updated by the MPU.

When the send engine 12 determines that the TOP pointer is not equal to the BTM pointer (step S13), the send engine 12 reads a descriptor 30 from a location of the memory 31 designated by the BTM pointer (step S14). By analyzing the read descriptor 30, when the send engine 12 determines that Mode [3] is equal to 1 (dummy mode set) (step S15), the send engine 12 generates a data pattern with the dummy/padding generation circuit 25 (step S16). When the send engine 12 determines that Mode [4] is equal to 1 (toggle mode set), the send engine 12 generates the data pattern in which the ptn0 and ptn1 informations are alternately repeated. When the send engine 12 determines that Mode [4] is equal to 0, the send engine 12 uses the ptn0 information itself as the data pattern. When the send engine 12 determines that Mode [3] is not equal to 1 (step S15), the send engine 12 reads user data from a data buffer, and, in a case that padding is required, the send engine 12 uses a data pattern of the ptn0 information as the padding data (step S17).

By analyzing the descriptor 30, when the send engine 12 determines that Mode [2] is equal to 1 (FCC generation) (step S18), the send engine 12 generates a FCC with the FCC generation circuit 23, and adds the generated FCC to the data (step S19).

By analyzing the descriptor 30, when the send engine 12 determines that Mode [1] is equal to 1 (BCC generation) (step S20), the send engine 12 generates a BCC with the BCC generation circuit 22, and adds the generated BCC to the data (step S21).

When the send engine 12 determines that the data transfer is completed successfully (step S22), the send engine 12 increments the BTM pointer (step S23), and the process returns to the step S13. Then, the send engine 12 performs determination about the number of remaining queues. When the send engine 12 determines that the data transfer is not completed successfully (step S22), the send engine 12 issues an error notification to the MPU (step S24), and performs an error clipping process and DMA restart operation (step S25).

What is claimed is:

1. A Direct Memory Access (DMA) circuit performing data transfer according to a descriptor that is instruction information of the data transfer, the circuit comprising:
   a descriptor obtaining unit obtaining the descriptor, the descriptor having an area in which mode information including a dummy mode is specified, and an area in which a first pattern for generating a verification data pattern is specified;
   a data pattern generation unit generating the verification data pattern of the DMA circuit; and
   a data transfer unit performing data transfer,
   wherein the data pattern generation unit generates the verification data pattern by using the first pattern according to the descriptor in a case that the dummy mode is set in the descriptor obtained by the descriptor obtaining unit, and
   wherein the data transfer unit uses the verification data pattern generated by the data pattern generation unit as dummy transfer data according to the obtained descriptor.

2. A Direct Memory Access (DMA) circuit performing data transfer according to a descriptor that is instruction information of the data transfer, the circuit comprising:
   a descriptor obtaining unit obtaining the descriptor;
   a data pattern generation unit generating a verification data pattern of the DMA circuit; and
   a data transfer unit performing data transfer,
   wherein the descriptor has an area in which mode information including a dummy mode is specified, an area in which mode information including a toggle mode is specified, an area in which a first pattern for generating the verification data pattern is specified, and an area in which a second pattern for generating the verification data pattern is specified,
   wherein the data pattern generation unit generates the verification data pattern in which the first pattern and the second pattern are alternately repeated in a case that the dummy mode is set and the toggle mode is set in the descriptor obtained by the descriptor obtaining unit, and generates the verification data pattern in which only the first pattern is included in a case that the dummy mode is set and the toggle mode is not set in the obtained descriptor, according to the obtained descriptor, and
   wherein the data transfer unit uses the verification data patterns generated by the data pattern generation unit as dummy transfer data in the cases that the dummy mode is set in the obtained descriptor.

3. The Direct Memory Access (DMA) circuit according to claim 1 further comprising:
   a host data control unit inputting transfer data received from a host computer to the data transfer unit, wherein the data transfer unit transfers the verification data pattern in which the first pattern is included, according to the obtained descriptor.

4. The Direct Memory Access (DMA) circuit according to claim 2, further comprising:
   a host data control unit inputting transfer data received from a host computer to the data transfer unit, wherein the data transfer unit transfers the verification data pattern in which the first pattern and the second pattern are included or the verification data pattern in which only the first pattern is included, according to the obtained descriptor.

* * * * *